Patented July 4, 1933

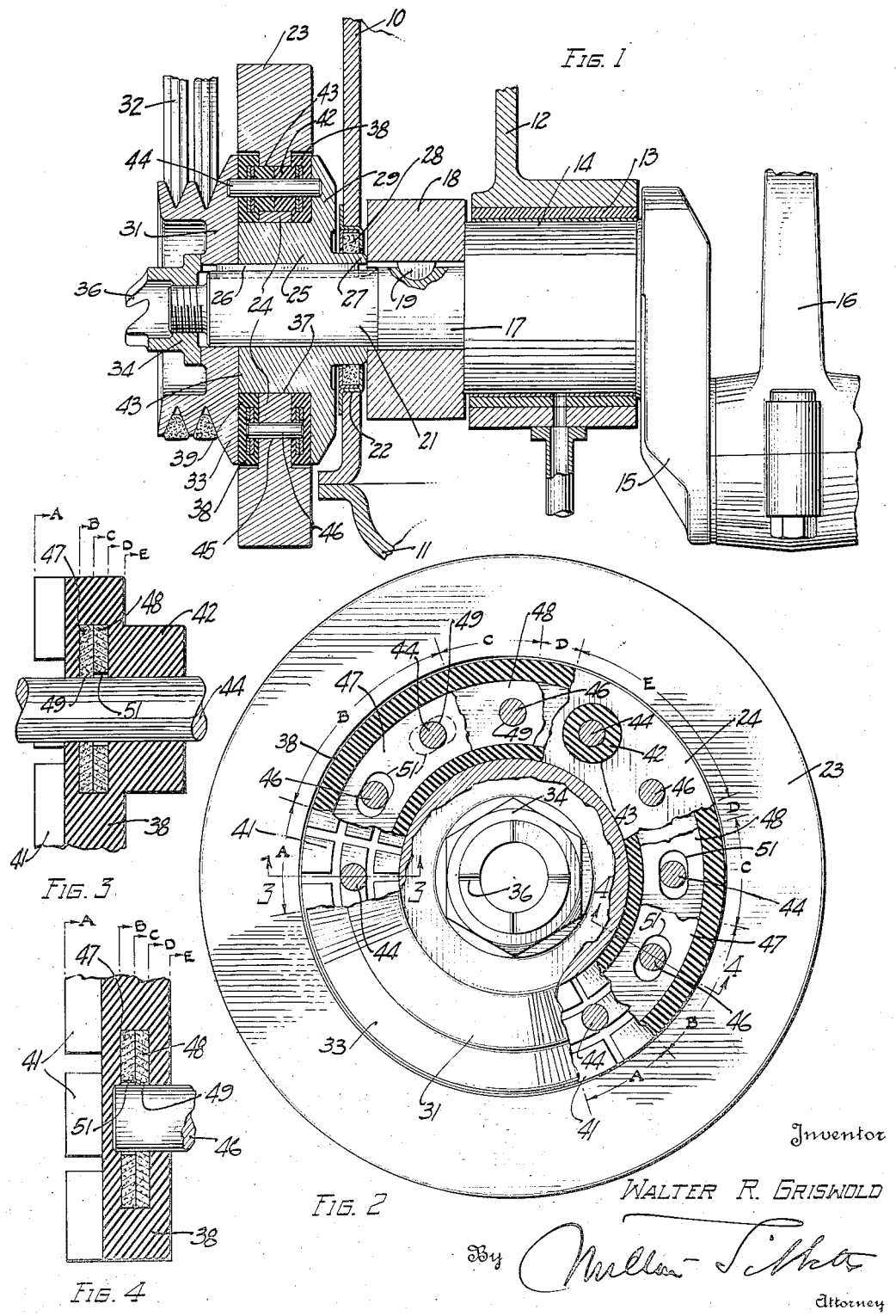

1,916,310

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed February 21, 1930. Serial No. 430,209.

This invention relates to internal combustion engines and more particularly to means for controlling torsional vibrations in the crank shafts of such engines.

It has for one of its objects to provide a simple and effective device adapted to frictionally damp such torsional vibration, in which the damping effect shall be free from variations caused by conditions extraneous to the damper.

Another object of the invention is to provide a vibration damper in which the damping effect is secured both by mechanical friction and by internal molecular friction or hysteresis.

Another object of the invention is to provide a vibration damper having mechanical friction damping devices and hysteresis damping devices, the former being entirely enclosed and protected by the latter.

A further object of the invention is to provide separate unitary damping devices for a vibration damper, so that the damper may be readily adjusted as to damping effect during manufacture, requiring little or no adjustment thereafter, and in which the damping elements may be easily renewed if desirable.

Other objects of the invention will appear from the folowing description taken in connection with the drawing, which forms a part of this specification, and in which:

Fig. 1 is a longtitudinal vertical section through part of an internal combustion engine provided with a vibration damper constructed in accordance with this invention;

Fig. 2 is a view to a larger scale in front elevation and partially broken away in several sections, designated by the arcuate arrows A to E, which sections are respectively taken substantially on the corresponding lines A to E of Figs. 3 and 4, and Figs. 3 and 4 are detail sections to a larger scale of parts of the vibration damper shown in Figs. 1 and 2, taken substantially on the line 3—3, and 4—4 respectively of Fig. 2.

Referring to the drawing, in Fig. 1 at 10 is represented the crank case of an internal combustion engine, having a lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawing, but are of usual construction.

Forwardly of the first bearing 13, the crank shaft 14 is preferably formed with a reduced portion 17, on which a gear or chain sprocket 18 may be keyed or otherwise secured as indicated at 19, and used to drive the engine cam shaft or other engine accessories, which are not shown in the drawing. Forwardly of the sprocket 18, the crank shaft is preferably further reduced in section as shown at 21, and projects through a suitable opening 22 in the front wall of the crank case 10.

The damping means of this invention is illustrated as mounted at or adjacent the end of the crank shaft 14. It is in the form of an annular inertia member 23, having a flanged portion 24 disposed radially inwardly, by which it is mounted coaxially with the crank shaft on a suitable part thereof. As shown, this part is the reduced portion 21 of the crank shaft 14, on which a bearing and retaining member 25 is keyed as indicated at 26. This bearing member is provided with an axial projection 27 which extends through the opening 22 in the crank case into engagement with the gear 18 to position the member axially in one direction, and cooperates with a packing device 28 mounted in the opening 22, to prevent the leakage of lubricant from the crank case and the ingres of dirt thereto. The bearing member is also provided with a radially disposed flange portion 29 adjacent the extension 27.

On the other side of the bearing member 25 there is a retaining member 31, which is also keyed to the crank shaft portion 21, as illustrated, and which may be a pulley, adapted to drive the engine cooling fan, or other engine accessories (not shown) through belts 32. The retaining member 31 is provided with a radial flange portion 33 which is oppositely disposed to the flange 29 of the bearing member 25. This member 31, and with it the members 25 and 18, may be retained on the shaft 14 by a member 34 in the form of a nut threaded to the end of the shaft portion 21, and formed with suitable teeth or lugs 36 for engagement with the usual hand starting crank for manually rotating the crank shaft for starting.

The flange 24 of the inertia member 23 may, if desired, be journaled on a bearing portion 37 of the member 25, or it may be centered on the resilient members presently to be described. It is disposed between the flanges 29 and 31. It is spaced from these flanges by resilient elastically deformable members 38, which are preferably formed of rubber or other suitable material having considerable internal friction or hysteresis. Each of the members 38 comprises a ring or flange 39 having one side formed with projections 41, separated by grooves, constituting a non-slip surface adapted to frictionally engage the surface of the corresponding flange 29 or 31. These projections 41 are readily compressed by the flanges upon assembly of the damper, and in effect they constitute a plurality of small resilient elements or springs, spaced over the surface of the rubber member 38 and having a lesser rate of action than the main body of rubber. Because of their greater yieldability, and because they are arranged in series with the rubber members 38 as regards axial compression, these members take up variations in compression caused by any reason, such as by manufacturing variations in the size of the damper parts, and they form in effect limiting springs for the friction damping, so that the damper is not hyper-sensitive to adjustment.

On the other side the member 39 is formed with an annular row of spaced cylindrical buttons or knobs 42 integral with the ring 39, which project axially into suitable bores or recesses 43 formed in the flange member 24. These members are oppositely disposed so that the free ends of each pair of the knobs 42 are in juxtaposition, and may be in abutting relation, if desired. The rubber members 38 may be axially compressed between the flanges 29 and 33, the amount of such axial compression depending on the thickness of the rubber damping elements and the axial length of the member 25.

The members 38 are connected to the flange members 29 and 33 by axially disposed pins 44, one of which extends through each pair of the buttons 42 and is seated at its ends in suitable coaxial holes in the flanges. Alternating with the recesses 43, are axially disposed holes 45, which pass through the flange 24. In each of these holes 45 is fixed a pin 46, these pins being somewhat shorter than the pins 44, and projecting from the sides of the flange 24 into, but not through, the rings 39.

From the device as thus far described, it will be seen that upon the occurrence of a torsional vibration in the crank shaft, the inertia member 23 because of its inertia, is unable to follow the high frequency oscillatory movement which is superposed on the normal forward rotation of the crank shaft, and that this lag of the inertia member causes relative oscillatory movement between the shaft and the inertia member 23. Because of this movement, those portions of the elastic members 38 which surround the pins 44, together with those portions which are adjacent the flanges 29 and 33, will be urged to oscillate with the flanges, which are secured to and oscillate with the shaft. On the other hand, those portions of the members 38 which are adjacent the flange 24 of the inertia member, together with those portions which are adjacent the projecting ends of the pins 46, will be urged to oscillate in unison with the inertia member 23. It will, therefore, be evident that these movements will cause distortion of the rubber members 38, different portions of these members being subjected to forces which act in different directions. Such distortion, as is well known, produces internal or molecular friction in the members 38, causing a loss of energy by hysteresis which is quite appreciable and measurable, and which assists in preventing the resonant growth of the energy of vibration. At the same time, the elastic force of the distorted rubber members is exerted on the inertia member in opposition to the relative movement thereof, and tends always to return the inertia member to its neutral position with respect to the crank shaft.

Further damping to provide adequate control of all vibration is secured by the provision of mechanical friction. To this end suitable friction damping means is imbedded in and completely enclosed by the elastic members 38, which act as a housing or cover therefor. As disclosed, this friction means comprises a pair of annular friction inserts or disks 47 and 48, which are placed side by side in frictional engagement within each of the members 38, and which are preferably vulcanized or cemented in place while the members 38 are being molded or otherwise formed. They may be made of any suitable material, such as micarta or molded asbestos.

These disks are provided with circumferentially spaced holes 49 and 51, through which the pins 44 and 46 project. The holes 49 are preferably so shaped that they are a close fit on their cooperating pins, while the holes 51 are slotted and may be of slightly greater width than the holes 49 to permit passage of the pin without actual contact therewith. These holes 49 and 51 alternate in the circumferential sequence of holes in each disk, and the disks are so arranged that each hole 49 of the disk 47 is aligned with a hole 51 of the disk 48. By this arrangement, it will be obvious that in each pair of disks, one of the disks, as 47, is actuated by the pins 44 and is unaffected by movement of the pins 46, while vice versa the disk 48 is actuated by the pins 46 and is unaffected by motion of the pins 44. As the pins 44 and 46 are respectively connected to the shaft through flanges 29 and 33, and to the inertia member through the flange 24, and as these pins accordingly partake of the relative motion between these members, it will be seen that this relative motion is communicated to the respective pairs of disks, causing an oscillatory sliding of each disk on its companion. As the disks are in physical contact, this sliding produces mechanical friction, dissipating a part of the energy of vibration in the form of heat, so as to damp the vibratory disturbance in the well known manner.

Since the disks 47 and 48 are completely enclosed within the elastic members 38, they are thoroughly protected from moisture, dirt, oil and other foreign matter affecting their friction values, so that the friction, and accordingly the damping effect at any particular engine speed remains substantially constant, being unaffected by conditions extraneous to the damper.

It will be observed that adjustment of this damper during and after installation is unnecessary and that no means for effecting such adjustment is provided. The damping effect desired is dependent largely on the friction between the disks, which in turn depends primarily on the axial compression of the rubber members, and this is controlled by making the rubber members 38 and the supporting member 25 of the proper dimensions. This, however, does not require the dimensions of these parts to be held between unreasonably close limits, and small variations from the predetermined compression have but little effect on the friction, since these are largely absorbed by the rubber projections 41, as previously explained. In this way the cost of manufacture and assembly of the device is greatly reduced, and a simple and effective damper is provided in which all delicate adjustment or tuning is obviated.

It will be understood that various forms of the invention other than those described above may be used without departing from the spirit or scope of the invention.

Having thus described the invention, what is claimed and desired to be secured by Letters Patent, is:

1. A vibration damper for shafts comprising an inertia member movable relative to said shaft, a deformable member associated with the shaft and with the inertia member, and relatively movable friction devices within said deformable member connected with the inertia member and the shaft and cooperable upon relative movement of the latter to absorb energy resulting from shaft vibration.

2. A vibration damper for shafts comprising an inertia member carried by the shaft and relatively movable thereon, friction disks connected respectively to the shaft and to the inertia member and operative upon relative movement to produce damping friction, and a rubber member completely surrounding said friction disks and connected both to the shaft and to the inertia member.

3. A vibration damper for shafts comprising an inertia member movable relative to said shaft, an elastically deformable member, means connecting said deformable member to the shaft, separate means connecting said deformable member to the inertia member, and engaging friction devices enclosed within said deformable member and connected respectively with the shaft and the inertia member.

4. A vibration damper for shafts having an inertia member movable relative to the shaft in response to vibration, comprising rubber damping members, friction devices vulcanized within said rubber members, and means connecting the rubber members between the shaft and the inertia member, and operatively engaging the friction devices to cause distortion of the members and friction between the friction devices upon said relative movement of the inertia member.

5. A vibration damper for shafts comprising an inertia member mounted for rotation relative to the shaft, radial flanges secured to the shaft and axially spaced from said inertia member, rubber members between the inertia member and said flanges, mechanical friction inserts, means connecting some of said inserts within said rubber members to the inertia member and means connecting the other inserts to said flanges, said means passing through the inserts and part of the rubber members to provide damping upon said relative movement of the inertia member.

6. A vibration damper comprising deformable energy transforming means, and mechanically engaging relatively movable friction devices imbedded in said deformable means.

7. A vibration damper comprising deformable energy transforming means, and mechanical engaging relatively movable friction devices enclosed within said deformable means.

8. A vibration damper comprising rubber members adapted to dissipate energy by hysteresis, and friction devices carried by and relatively movable upon deformation of said rubber members.

9. A vibration damper comprising rubber members deformable to damp vibration, and friction devices enclosed in said rubber members and relatively movable upon deformation thereof.

10. A vibration damper for shafts having an inertia member responsive to shaft vibration, comprising rubber damping members connected between said shaft and inertia member, and cooperating friction members enclosed by the rubber members and connected respectively to the shaft and to the inertia member.

11. A vibration damper for shafts comprising an inertia member mounted for rotation relative to the shaft, radial flanges secured to the shaft and axially spaced from said inertia member, rubber members between the inertia member and said flanges, friction disks operatively associated in pairs imbedded in said rubber members, axially disposed pins connecting the flanges and the rubber members and one disk of each said pair of friction discs, and other pins connecting the inertia member and the rubber member and the other disk of each pair of said friction discs, whereby said relative movement produces hysteresis in the rubber members and mechanical friction between said disks.

12. A vibration damper for shafts having an inertia member movable relative to the shaft, rubber members, friction disks associated in pairs and vulcanized within said rubber members, means connecting the rubber members and one disk of each pair to the shaft, and means connecting the rubber members and the other disk of each pair to the inertia member, said means cooperating to produce hysteresis in the rubber members and friction between said disks upon said relative movement.

13. A vibration damper comprising friction damping means, and a deformable cover for said means adapted to damp vibration.

14. A vibration damper comprising a friction damping device, an elastic means enclosing said device and coperating therewith to damp vibration.

15. A vibration damper comprising a friction damping device, a rubber member enclosing said device, and means operable in response to vibratory movement to actuate said device and to distort said member, whereby the vibration is damped.

16. A vibration damper comprising a friction damping device and a rubber member enclosing said device.

17. A vibration damper for shafts comprising an inertia member movable relative to said shaft, cooperable friction devices, means connecting one of said devices to said shaft, means connecting other of said devices to the inertia member, and a rubber cover member completely enclosing said devices and means.

18. A vibration damper for shafts comprising an inertia member movable relative to said shaft, a pair of friction devices disposed in contact to produce friction upon relative movement, means connecting one of said devices to move wth the shaft, means connecting the other device to move with the inertia member, and a rubber member deformable to accommodate said relative movement entirely enclosing said friction devices.

19. A vibration damper for shafts comprising a shaft member, an inertia member adjacent said shaft member and adapted to oscillate relatively thereto, cooperable friction devices arranged in contact between said members, each having holes and slots alternating in a circumferential row with the holes of each device in axial alignment with the slots of the other device, axially disposed pins carried by the shaft member and projecting through the slots of one device and in operative engagement with the aligned holes of the other device, and axially disposed pins carried by the inertia member and projecting through the slots of the second device and engaging the holes of the first device.

20. A vibration damper for shafts comprising shaft members, an inertia member mounted between the shaft members for oscillation relatively thereto and having a circumferential row of axially disposed recesses, rubber members having flange portions between the inertia member and the shaft members and integral rubber bosses seated in said recesses, friction devices including disks arranged in frictional contact and imbedded in and completely enclosed by said rubber members, each disk having holes and slots alternating in a circumferential row with the holes of each disk aligned with the slots of the other disk, pins carried by the shaft members and projecting through the bosses and the slots of one disk and the holes of the other disk whereby said second disk oscillates with the shaft members, and pins carried by the inertia member and projecting through the holes of the first disk and the slots of the second disk whereby the first disk oscillates with the inertia member, said pins distorting the rubber member upon relative movement between the shaft and the inertia member.

21. A vibration damper for shafts comprising shaft members, an inertia member mounted for oscillation relatively thereto, cooperable friction disks between the inertia member and each shaft member, each disk having holes and arcuate slots of greater width than the diameter of the holes alternating in a circumferential row with the holes in each disk aligned with the slots of the cooperating disk, pins carried by the inertia member and engaging the holes of one of the disks and passing through the slots of the other disk, pins carried by the shaft members and passing through the slots of the first disk and engaging the holes of the other disk, whereby relative movement between the inertia member and the shaft will relatively oscillate the disks to produce damping friction, and a rubber member deformable in response to said relative movement enclosing said friction members.

22. A vibration damper for shafts comprising an inertia member movable relatively to said shaft, damping means connected between said inertia member and said shaft and operable upon relative movement therebetween, and a rubber member enclosing said damping means.

23. A vibration damper for a shaft having an inertia member movable relatively to said shaft, an elastically deformable member, means connecting said deformable member to the shaft, a friction device enclosed within said deformable member, and means frictionally cooperating with said friction device carried with said inertia member.

24. In a vibration damper, the combination with a hub member, of an inertia member supported for rotation on the hub member means including cooperating friction elements acting between said members to retard relative rotation thereof, said elements having cooperating friction developing surfaces, and means comprising rubber associated with said elements for screening the cooperating friction developing surfaces thereof to prevent the entry of dirt and moisture therebetween.

In testimony whereof I affix my signature.

WALTER R. GRISWOLD.